(12) United States Patent
Fuller

(10) Patent No.: US 8,850,260 B1
(45) Date of Patent: Sep. 30, 2014

(54) PROGRAMMABLE ERROR HANDLING

(75) Inventor: Randy Fuller, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 253 days.

(21) Appl. No.: 13/207,264

(22) Filed: Aug. 10, 2011

Related U.S. Application Data

(60) Provisional application No. 61/385,443, filed on Sep. 22, 2010.

(51) Int. Cl.
*G06F 11/00* (2006.01)
(52) U.S. Cl.
USPC ............................................. 714/3; 714/5.1
(58) Field of Classification Search
USPC ............................................................ 714/3
See application file for complete search history.

(56) References Cited

U.S. PATENT DOCUMENTS

| | | | |
|---|---|---|---|
| 5,712,969 A * | 1/1998 | Zimmermann et al. ....... | 714/5.1 |
| 6,559,714 B2 * | 5/2003 | Park et al. ..................... | 327/553 |
| 7,177,528 B1 | 2/2007 | Yada et al. | |
| 7,185,222 B2 * | 2/2007 | Burton et al. ................. | 714/5.11 |
| 7,222,267 B2 | 5/2007 | Jeong | |
| 7,930,599 B2 * | 4/2011 | Murakami ...................... | 714/48 |
| 8,095,831 B2 * | 1/2012 | Moyer et al. ................... | 714/57 |
| 2002/0140523 A1 * | 10/2002 | Park et al. ..................... | 333/172 |
| 2004/0153880 A1 * | 8/2004 | Jeong .............................. | 714/48 |
| 2008/0307134 A1 * | 12/2008 | Geissler et al. ............... | 710/110 |
| 2010/0125750 A1 * | 5/2010 | Moyer et al. ...................... | 714/5 |

* cited by examiner

*Primary Examiner* — Kamini Patel

(57) ABSTRACT

A data storage device having different operating modes is disclosed. The data storage device comprises a processor, a command execution module, and an error response module. The command execution module is configured to receive commands from the processor, execute the commands, and report status information to the processor. The error response module comprises a programmable register configured to store one of a plurality of different error response types for each of a plurality of errors, wherein the error response module is configured to receive a report of one of the errors, and to output an error response signal to the command execution module based on the error response type in the register corresponding to the reported error. The processor is configured to reprogram at least one of the error response types in the register for at least one of the errors when the data storage device switches operating modes.

27 Claims, 6 Drawing Sheets

PROGRAMMABLE ERROR HANDLING

CROSS-REFERENCE TO RELATED APPLICATIONS

The present application claims priority from co-pending provisional U.S. Patent Application Ser. No. 61/385,443, filed on Sep. 22, 2010, the specification of which is incorporated herein by reference.

BACKGROUND

Data storage devices are commonly used to store data in computers, data bases, digital video recorders, and other devices. Data storage devices may include disk drives, solid state drives, and hybrid drives including both a disk and solid state memory. Different types of errors may occur during operation of a data storage device. For example, in a disk drive, a head used to write data on a disk may be pushed off track (e.g., due to vibration), which can result in data loss if the error is not detected and properly handled. Therefore, it is desirable to detect errors in a data storage device and to handle the detected errors appropriately.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
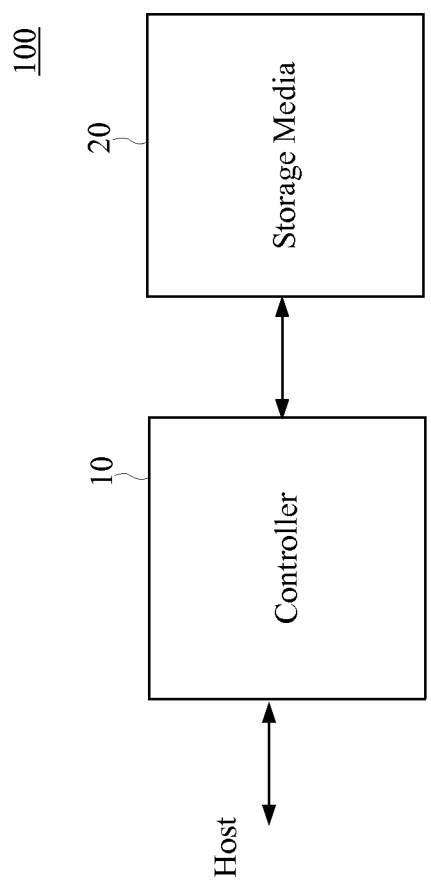
FIG. 1 is a block diagram of a data storage device according to an embodiment of the present invention.

FIG. 1 shows a data storage device 100 according to an embodiment of the present invention. The data storage device 100 comprises a storage media 20 and a controller 10. The storage media 20 may include one or more disks, non-volatile semiconductor memory, or other type of storage media. The controller 10 is configured to write data to and read data from the storage media 20 based on write/read commands from a host, which uses the data storage device 100 to store data. The controller 10 may interface with the host according to a serial advanced technology attachment (SATA) or other interface standard.

Figure 2:
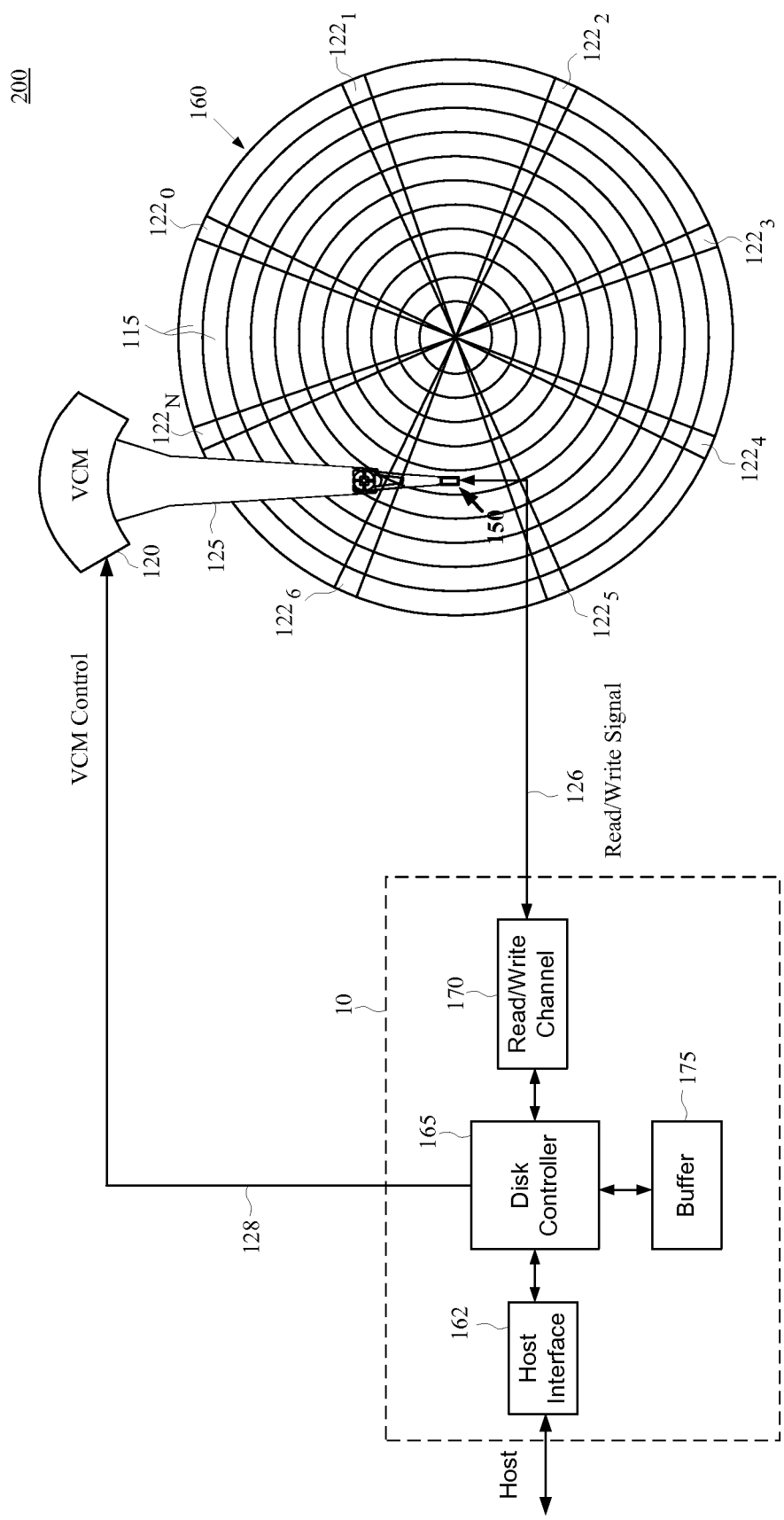
FIG. 2 is a block diagram of a disk drive according to an embodiment of the present invention.

FIG. 2 shows a disk drive 200 according to an embodiment of the present invention. The disk drive 200 comprises a rotating magnetic disk 160, an actuator arm 125, a voice coil motor (VCM) 120, and a head 150 connected to the distal end of an actuator arm 125. The actuator arm 125 is rotated about a pivot by the VCM 120 to position the head 150 radially over the disk 160. A spin motor (not shown) rotates the disk 160.

The disk 160 comprises a number of radially spaced, concentric tracks 115. Each track 115 may be further divided into a number of data sectors (not shown) that are spaced circumferentially along the track 115. The data sectors may be used to store user data and/or other information on the disk 160. The disk 160 may also comprise a plurality of angularly spaced servo wedges $122_0$-$122_N$, each of which may include embedded servo information (e.g., servo bursts) that can be read from the disk 160 by the head 150 to determine the position of the head 150 over the disk 160. The data sectors may be located between the servo wedges $122_0$-$122_N$.

The disk drive 200 also comprises a disk controller 165, a read/write channel 170, a host interface 162, and a buffer 175 as shown in the example in FIG. 1. The disk controller 165 may be implemented using one or more processors for executing instructions (firmware) stored in memory, such as a volatile or non-volatile memory. The instructions may be executed by the one or more processors to perform the various functions of the disk controller 165 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The read/write channel 170 is configured to receive data to be written to the disk 160 from the disk controller 165 and process the data into a write signal 126, which is outputted to the head 150. The head 150 converts the write signal 126 into a magnetic field that magnetizes the surface of the disk 160 based on the write signal 126, thereby magnetically writing the data to the disk 60. The read/write channel 170 is also configured to receive a read signal 126 from the head 150 based on the magnetization of the disk surface under the head 150. The read/write channel 170 processes the read signal 126 into data, which is outputted to the disk controller 165.

The host interface 162 is configured to interface the disk drive 200 with a host (e.g., host processor) that uses the disk drive 200 for data storage. The disk controller 165 receives commands (e.g., read/write commands) and data from the host via the host interface 162. The disk controller 165 also outputs data (e.g., data requested by a host read command) to the host via the host interface 162. The host interface 162 may interface with the host according to the serial advanced technology attachment (SATA) standard or other standard.

During normal write/read operations, the disk controller 165 may write data to and read data from the disk 160 in response to write/read commands from the host. When the disk controller 165 receives a write command via the host interface 162, the disk controller 165 may temporarily hold the corresponding data from the host in the buffer 175 (e.g., DRAM) and transfer the data from the buffer to the read/write channel 170 to write the data on the disk 160. The disk controller 165 may notify the host via the host interface 162 when the write command has been completed (e.g., when the data has been successfully written to the disk 160). Similarly, when the disk controller 165 receives a read command from the host via the host interface 162, the disk controller 165 may read the data requested by the read command from the disk 160 using the read/write channel 170, temporarily hold the read data in the buffer and output the read data from the buffer to the host via the host interface 162.

To write data to the disk 160, the disk controller 165 may first position the head 150 at a desired track on the disk 160. The disk controller 165 may do this by sending a command 128 to the VCM 20 to position the head 150 at the desired track. After the head 150 is positioned at the desired track, the disk controller 165 may perform track following to keep the head 150 on the desired track. The disk controller 165 may do this by reading servo information (e.g., servo bursts) from the servo wedges on the track via the read/write channel 170 and generating a position error signal (PES) based on the read servo information indicating the offset of the head 150 from the center of the desired track. The disk controller 165 may then send a command 128 to adjust the position of the head 150 in a direction that reduces the PES, thereby keeping the head 150 on track. When the head 150 is properly positioned, the disk controller 165 may transfer the data from the buffer 175 to the read/write channel 170 to write the data to the disk 160 using the head 150.

To read data from the disk 160, the disk controller 165 may first position the head 150 at a desired track on the disk 160 as described above. After the head 150 is positioned at the desired track, the disk controller 165 may perform track following as described above to keep the head 150 on track during the read operation. When the head 150 is properly positioned over the track, the disk controller 165 may read the data from the desired track using the read/write channel 170 and transfer the read data to the buffer 175 for temporary storage. The read data may later be sent from the buffer 175 to the host via the host interface 162.

The disk controller 165 may also access the disk 160 in other circumstances besides in response to host write/read commands. For example, the disk controller 165 may access the disk 160 during intelligent burn in to detect defective areas on the disk 160 and map out the defective areas so that they are not used during normal write/read operations. This may involve writing a test pattern on the disk 160 and then reading the test pattern back to detect the defective areas on the disk 160. In another example, the disk controller 165 may write servo information (e.g., servo bursts, tack IDs, etc.) in the servo wedges $122_0$-$122_N$ during a self servo write. In yet another example, the disk controller 160 may refresh data on the disk 160 by reading the data from the disk 160, and then rewriting the data back to the disk 160. This may be done to refresh data on the disk 160 that has deteriorated over time, e.g., due to adjacent track interference, thermal degradation, and/or other cause.

Thus, the disk drive 200 may operate in a number of different operating modes including read mode, write mode, intelligent burn in mode, self servo write mode, and refresh mode. An example of other operating mode is speculative read mode where the disk controller 165 determines whether data requested by the host is located in the buffer 175, in which case the data can be read from the buffer 175 without having to access the disk 160. It is to be appreciated that the operating modes of the disk drive 200 are not limited to the examples given above, and that the disk drive may operate in other additional operating modes.

The disk drive 200 may detect different types of errors during operation. For example, an error may occur when the head 150 is pushed too far off track to safely write data on the disk 160 (e.g., due to vibration or shock). This error may be detected when the position error signal (PES) exceeds a write unsafe (WUS) limit. An error may also occur when the read/write channel 170 is unable to recover data read from the disk 160 and/or data is corrupted during transfer. Other types of errors may also occur, examples of which are provided below.

The disk controller 165 may respond differently to different detected errors. For example, the disk controller 165 may have a plurality of different error response types and select one of the error response types to respond to a particular detected error. The error response types may include a continue error response, a stop error response, a stop immediate error response and, a stop flush error response.

For the continue error response, the detected error is used by the disk controller 165 for informational purposes only and does not affect data sector transfers by the disk controller 165. Data sector transfers occur as though the error did not occur. For example, the continue response may be used when a bad sector is detected in a video stream. In this example, the disk controller 165 may continue transferring other sectors of the video stream since one bad sector may be tolerated, and the disk controller 165 may use the detected error to identify the bad sector.

For the stop error response, the disk controller 165 may stop transferring data once the data sector that is currently being transferred has completed transfer. Thus, data transfer stops on a sector boundary. For the stop immediate error response, the disk controller 165 may stop transferring data immediately upon detection of the error regardless of sector boundaries. For a stop flush error response, the disk controller 165 may continue transferring data until the current data sectors residing in the read/write channel 170 are flushed.

The disk controller 165 may respond differently to the same error depending on the operating mode of the disk drive 200. For example, the disk controller 165 may select a different error response type to respond to the same error depending on the operating mode of the disk drive 200. In various embodiments of the present invention, the disk controller 165 has the flexibility to handle detected errors differently in different operating modes, as discussed further below.

Figure 3:
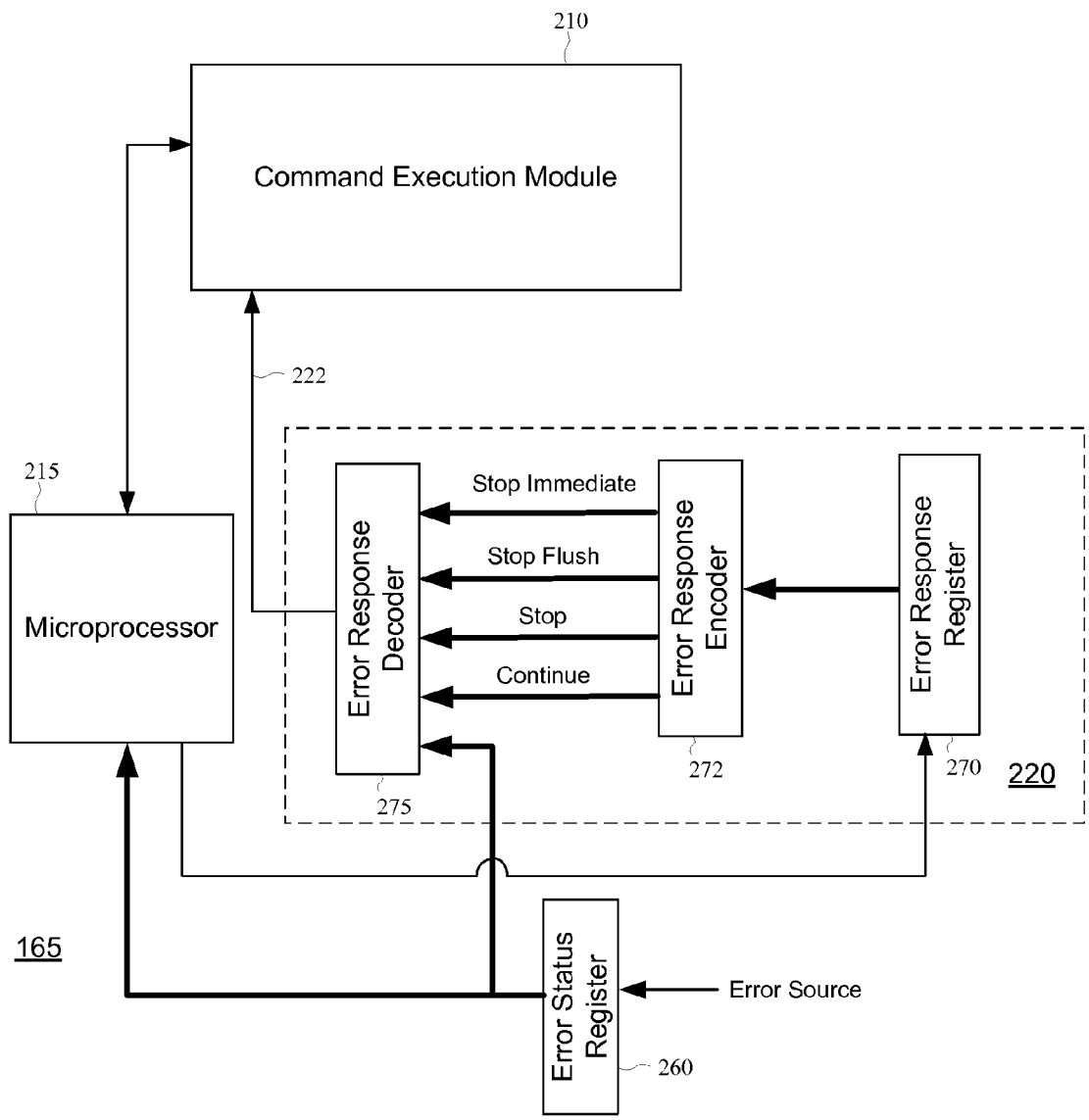
FIG. 3 is a block diagram of a disk controller with programmable error handling according to an embodiment of the present invention.

FIG. 3 shows the disk controller 165 with programmable error handling according to an embodiment of the present invention.

The disk controller 165 comprises a microprocessor 215, a command execution module 210, an error response module 220, and an error status register 260. The microprocessor 215 may be configured to manage various operations of the disk controller 165. The microprocessor 215 may initiate an operation of the disk controller 165 by issuing a command to the command execution module 210 to perform the operation. The operation may include a data read from the disk 160, a data write to the disk 160, a self servo write and/or other operation. The command execution module 210 receives the command from the microprocessor 215, executes the command, and reports status information to the microprocessor 215. For example, for a data write to the disk 160, the command execution module 210 may transfer data from the buffer 175 to the read/write channel 170 to write the data on the disk 160. The data may be transferred in data sectors. After the data is successfully written to the disk 160, the command execution module 210 may report this to the microprocessor 215, including which sectors have been successfully written.

The error status register 260 is configured to receive detected errors from various sources in the disk drive 200 and report the detected errors to the microprocessor 215 and the error response module 220. In one embodiment, the error status register 260 may store a plurality of bits where each bit corresponds to one of the detectable errors. In this embodiment, the bit for a particular error may be one when the error is detected and zero otherwise. When one of the errors is detected, an interrupt may be sent to the microprocessor 215 alerting the microprocessor 215 that an error has occurred. The microprocessor 215 may then read the error status register 260 to determine which error has occurred. For example, the microprocessor 260 may determine which error has occurred based on which bit in the error status register 260 has a value of one and the error corresponding to that bit.

The error response module 220 is configured to receive a report of a detected error from the error status register 260 and to determine an appropriate error response based on the detected error. The error response module 220 may then output an error response signal 222 to the command execution module 210 directing the command execution module 210 to respond to the detected error accordingly. For example, the error response module 220 may select any one of the error response types discussed above including the continue error response, the stop error response, the stop immediate error response and the stop flush error response. For the continue error response, the error response module 220 does not output a response signal 222 to the command execution module 210 since the continue error response does not affect data sector transfers, as discussed above. For the stop error response, the error response signal 222 may direct the execution command module 210 to stop data transfers on a sector boundary (i.e., after a data sector currently being transferred has completed transfer). For the stop immediate error response, the error response signal 222 may direct the command execution module 210 to immediately stop all data transfers. For the stop flush error response, the error response signal 222 may direct the command execution module 210 to flush the data sectors residing in the read/write channel 170 before stopping data transfers.

In one embodiment, the error response module 220 comprises an error response register 270 that stores one of a plurality of different error response types for each detectable error. For example, the error response types may include the continue error response, the stop error response, the stop immediate error response, and the stop flush error response. In this example, the error response type for each detectable error may be programmed with two bits, in which the values of the two bits specify the error response type. Table 1 below shows an example of the bit values for different error response types.

TABLE 1

| Error Response Type | $bit_0$ | $bit_1$ |
| --- | --- | --- |
| Continue | 0 | 0 |
| Stop | 0 | 1 |
| Stop Flush | 1 | 0 |
| Stop Immediate | 1 | 1 |

In the above example, the error response register 270 may comprise two registers, in which a first one of the registers stores the value of $bit_0$ for each detectable error and a second one of the registers stores the value of $bit_1$ for each detectable error. The programmed error response type for a particular error may be determined by reading the value of $bit_0$ for the error from the first register and reading the value of $bit_1$ for the error from the second register. For example, when the value of $bit_0$ is one and the value of $bit_1$ is one for a particular error, then the error response type programmed for that error is the stop immediate error response according to the example in Table 1.

In one embodiment, when the error response module 220 receives a report of a detected error from the error status register 260, the error response module 220 may determine an error response for the detected error based on the error response type programmed for that error in the error response register 270. For example, if the stop error response is programmed for the detected error in the error response register 270, then the error response module 220 selects the stop error response and outputs an error response signal 222 to the command execution module 270 directing the command execution module 210 to stop data transfers on a sector boundary.

The microprocessor 215 may program the error response type for one or more of the detectable errors in the error response register 260. In this embodiment, the microprocessor 215 may program the error response type for a particular error by programming the set of bits in the error response register 270 specifying the error response type for that error. For example, if the microprocessor 215 desires to program the stop flush error response for the error, then the microprocessor 215 can program a one for $bit_0$ and a zero for $bit_1$ corresponding to that error.

In one embodiment, the microprocessor 215 may reprogram the error response type stored in the error response register 270 for each of one or more of the detectable errors when the disk drive 200 switches operating modes. This allows the microprocessor 215 to reconfigure the error handling for different operating modes including, for example, read mode, write mode, self servo write mode, refresh mode and speculative read mode. In this embodiment, when the disk drive 200 switches from one operating mode to another operating mode, the microprocessor 215 may reprogram the error response types for the detectable errors that have different error responses in the two operating modes. This provides a flexible error handling scheme that allows various errors to be handled differently based upon programmable error response types.

In one embodiment, the error status register 260 may output an n-bit vector to the error response module 220 indicating which error has been detected, where n may be the number of detectable errors that can be reported to the error response module 220. In this example, each bit of the n-bit vector corresponds to one of the detectable errors, and may have a value of one when the corresponding error is detected and a value of zero otherwise. For example, an 8-bit vector having values (0, 1, 0, 0, 0, 0, 0, 0) indicates that the error corresponding to the second bit has been detected. In this example, there may be eight detectable errors that can be reported to the error response module 220. A larger vector may be used for more detectable errors.

In this embodiment, the error response module 220 may comprise an error response encoder 272 and an error response decoder 275. The error response encoder 272 is configured to generate an n-bit vector for each error response type based on the error response types programmed for the different errors in the error response register 270. For each error response type, the corresponding n-bit vector has a value of one for each bit corresponding to an error that is programmed with the error response type and has a value of zero for each of the remaining bits. For example, if the errors corresponding to the first, second, sixth and seventh bits are programmed with the stop error response in the error response register 270, then the n-bit vector for the stop error response will have a value of one for each of the first, second, sixth and seventh bits and a value of zero for each of the remaining bits.

The error response decoder 275 is configured to receive the n-bit vector from the error status register 260 reporting which error has been detected. The error response decoder 275 also receives the n-bit vector for each of the error response types from the error response encoder 272. In the example shown in FIG. 3, the error response decoder 275 receives an n-bit vector for each of the stop immediate error response, the stop flush error response, the stop error response, and the continue error response. For each error response type, the error response decoder 275 compares the bits of the n-bit vector for the error response type with the respective bits of the n-vector from the error status register 260. The error response decoder 275 selects a particular error response type when one of the bits in the n-bit vector for the error response type and the respective bit in the n-bit vector from the error status register 260 both have a value of one.

The operation of the error response encoder 272 and the error response decoder 275 may also be explained by way of example. Table 2 below shows an example of the error response type programmed for each of eight detectable errors denoted error 1 to error 8 for the read mode. It is to be appreciated that the error response type programmed for each error may be different for other operating modes of the disk drive 200.

TABLE 2

| Detectable Error | Error Response Type |
| --- | --- |
| Error 1 | Stop Error Response |
| Error 2 | Stop Error Response |
| Error 3 | Continue Error Response |
| Error 4 | Stop Immediate Error Response |
| Error 5 | Continue Error Response |
| Error 6 | Stop Error Response |
| Error 7 | Stop Error Response |
| Error 8 | Stop Flush Error Response |

In this example, the error response encoder 272 may generate an n-bit vector for the stop error response having values (1, 1, 0, 0, 0, 1, 1, 0). This is because, in the example shown in Table 2, errors 1, 2, 6 and 7, which correspond to the first, second, sixth and seventh bits of the n-bit vector, are each programmed with the stop error response. Similarly, the error response encoder 272 may generate an n-bit vector for the continue error response having values (0, 0, 1, 0, 1, 0, 0, 0), and so forth. After the error response encoder 272 generates an n-bit vector for each error response type, the error response decoder 275 may compare the n-bit vector for each error response type with the n-bit vector from the error status register 260 to select one of the error response types. For example, if the error status register 260 outputs an n-bit vector having values (0, 1, 0, 0, 0, 0, 0, 0) indicating that error 2 has been detected, then the error response decoder 275 selects the stop error response. This is because, in this example, the second bit of both the n-bit vector from the error status register 260 and the n-bit vector for the stop error response have a value of one.

Examples of errors that may be detected and reported to the error status register 260 include an uncorrectable error, a synch error, a parity error, and other types of errors. An uncorrectable error may occur when the read/write channel 170 is unable to correct errors in a read data sector using an error correction algorithm and is therefore unable to recover the data sector. A synch error may occur when servo information is not properly read from the disk 160, and, as a result, the disk controller 165 is unable to synchronize with the beginning of a data sector on the disk 160. A parity error may occur in the data path between the read/write channel 170 and the buffer 175. It is to be appreciated that embodiments of the present invention are not limited to the example errors given above.

Figure 4:
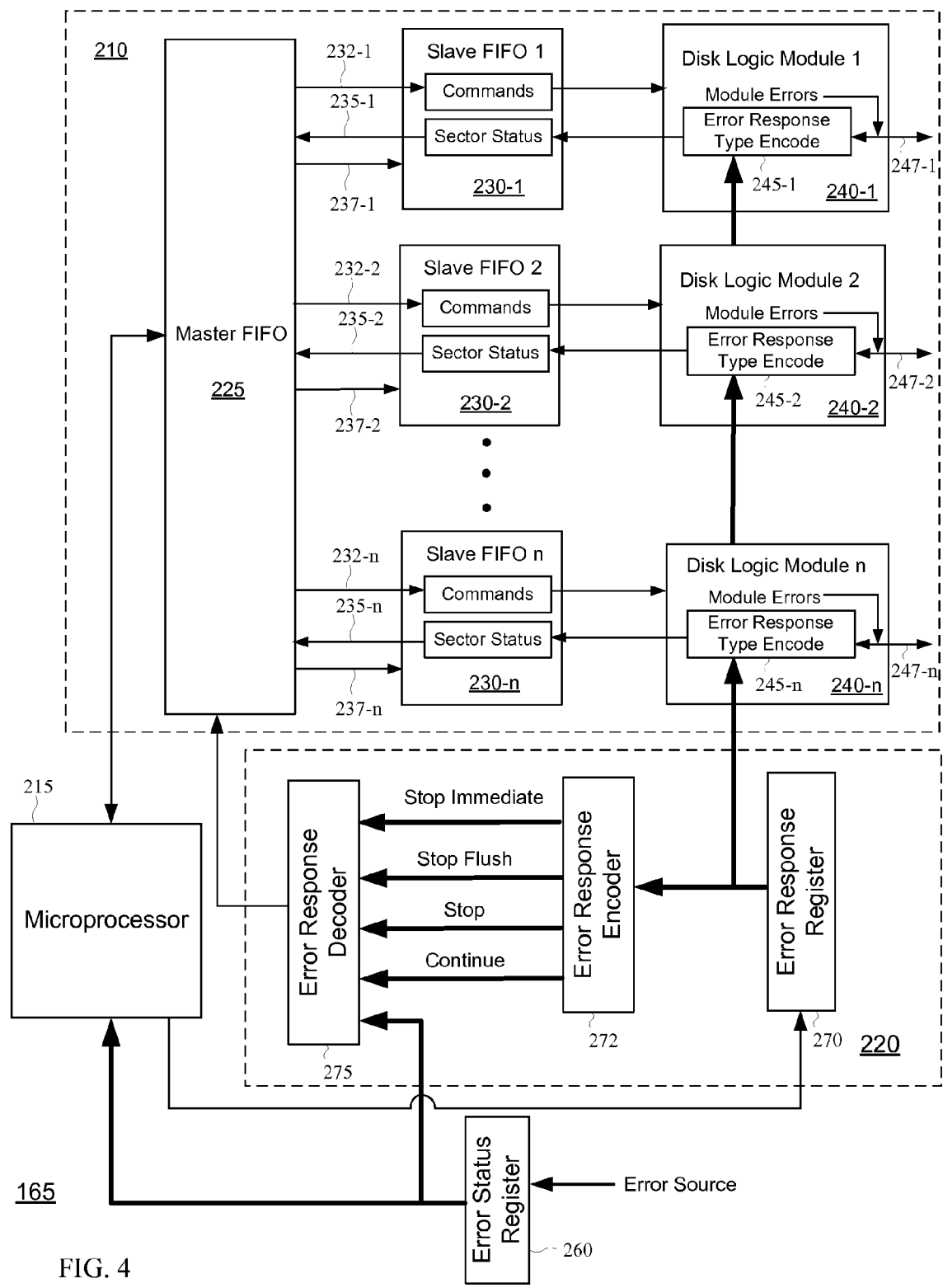
FIG. 4 is a block diagram of a disk controller with programmable error handling according to another embodiment of the present invention.

FIG. 4 shows the command execution module 210 according to an embodiment of the present invention. In this embodiment, the command execution module 210 comprises a plurality of disk logic modules 240-1 to 240-n. Each disk logic module 240-1 to 240-n may be configured to perform a different sub-function of the command executable module 210. For example, one of the disk logic modules 240-1 to 240-n may be configured to read data from the disk 160, one of the disk logic modules 240-1 to 240-n may be a buffer interface configured to move data between the disk controller 165 and the buffer 175, and one of the disk logic modules 240-1 to 240-n may be configured to read a hard sector table to define the format of data on the disk 160 (e.g., sector size). It is to be appreciated that the disk logic modules may perform other sub-functions of the disk controller 165, and are not limited to the examples given above.

The command execution module 210 may comprises a master first-in-first-out queue (FIFO) 225, and a slave FIFO 230-1 to 230-n for each one of the disk logic modules 240-1 to 240-n. In one embodiment, the master FIFO 225 is configured to receive commands from the microprocessor 215 and queue the commands for execution by the various disk logic modules 240-1 to 240-n. In this embodiment, the microprocessor 215 may send commands to the master FIFO 225 so that only commands of the same type are in the master FIFO 225 at a given time. For example, the microprocessor 215 may send read commands to the master FIFO 225, and wait until the read commands have been completed before sending write commands to the master FIFO 225. In this example, if a change in the type of commands sent to the master FIFO 225 corresponds to a switch in the operating mode of the disk drive, then the microprocessor 215 may also reprogram the error response register 270 accordingly, as discussed above.

The master FIFO 225 may push a command to one of the disk logic modules 240-1 to 240-n via the respective slave FIFO 230-1 to 230-n based on the disk logic module 240-1 to 240-n that performs the function associated the command. The master FIFO 225 may also push portions of a command to different disk logic modules 240-1 to 240-n via their respective slave FIFOs 230-1 to 230-n, where each of the disk logic modules performs a different sub-function associated with the command. Thus, each of the disk logic modules 240-1 to 240-n may receive a portion (e.g., fields) of the command that is relevant to the sub-function performed by the disk logic module 240-1 to 240-n. In this embodiment, each slave FIFO 230-1 to 230-n may be configured to identify the portion of a command that is relevant to the respective disk logic module 240-1 to 240-n and capture that portion of the command.

In one embodiment, each slave FIFO 230-1 to 230-n may queue portions of commands from the master FIFO 225 that are relevant to the respective disk logic module 240-1 to 240-n. The disk logic module 240-1 to 240-n may then fetch the portions of the commands from the slave FIFO 230-1 to 230-n (e.g., one by one) and execute the portions of the commands. When the disk logic module 240-1 to 240-n completes a portion of a command, the disk logic module 240-1 to 240-n may send a done sector status for the data sector(s) corresponding to the command to the slave FIFO 230-1 to 230-n. The slave FIFO 230-1 to 230-n may then forward the done sector status to the master FIFO 225. When all of the disk logic modules 240-1 to 240-n for a command have reported a done sector status, the master FIFO 225 may report to the microprocessor 215 that the command for the sector(s) has been completed. FIG. 4 shows the command paths 232-1 to 232-n and the sector status paths 235-1 to 235-n for each slave FIFO 230-1 to 230-n.

Each disk logic module 240-1 to 240-n may be configured to detect one or more errors associated with the sub-function performed by the disk logic module 240-1 to 240-n (labeled "module errors" in FIG. 4). When a disk logic module 240-1 to 240-n detects an error, the disk logic module 240-1 to 240-n may report this error to the error status register 260 via path 247-1 to 247-n. For example, when a disk logic module 240-1 to 240-n determines that a sector is uncorrectable (e.g., by the read/write channel 170), the disk logic module may report a sector uncorrectable error. The error detected by a disk logic module 240-1 to 240-n may be detected internally in the disk logic module and/or reported to the disk logic module from an external source. In FIG. 4, the complete error reporting paths 247-1 to 247-n are not shown for ease of illustration.

When an error is detected and reported to the error status register 260, the error response module 220 selects one of the error response types and outputs an error response signal 222 based on the selected error response type to the command execution module 210 to respond to the error accordingly.

Figure 5:
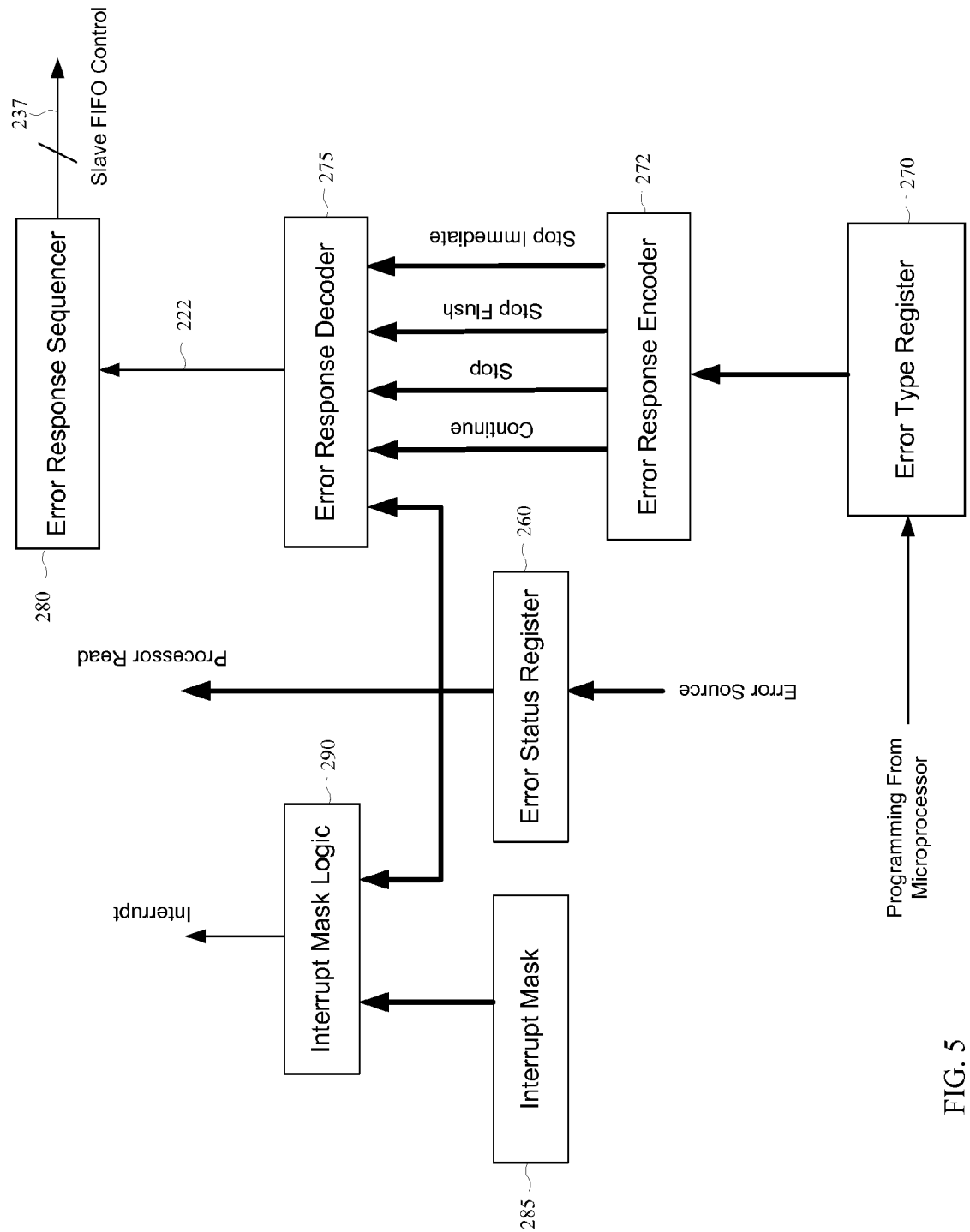
FIG. 5 is a block diagram of an error response module and an error status register according to an embodiment of the present invention.

Referring to FIG. 5, the master FIFO may include an error response sequencer 280 that receives the error response signal 222 from the error response decoder 275 and issues control signals 237 to the slave FIFOs 230-1 to 230-n based on the error response signal 222. FIG. 4 shows separate control signals 237-1 to 237-n to the individual slave FIFOs 230-1 to 230-n. For the continue error response, the error response decoder 275 does not send an error response signal 222 to the error response sequencer 280 since the continue error response does not affect data transfer. For the stop immediate error response, the error response sequencer 280 may send control signals 237-1 to 237-n to the slave FIFOs 230-1 to 230-n to immediately stop the sector in progress. The error response sequencer 280 may also send control signals (not shown) to the disk logic modules 240-1 to 240-n to immediately freeze operation of the disk logic modules 240-1 to 240-n. For the stop error response, the error response sequencer 280 may send control signals 237-1 to 237-n to the slave FIFOs 230-1 to 230-n to finish the current sector in process and stop after the current sector is finished.

For the stop flush error response, the error response sequencer 280 may send control signals 237-1 to 237-n to the slave FIFOs to stop after the sectors in a channel have been flushed. In this embodiment, the error response sequencer 280 may keep track of how many sectors one or more disk logic modules 240-1 to 240-n has outstanding. When the error response sequencer 280 receives an error response signal 222 for the stop flush error response, the error response sequencer 280 may wait until the master FIFO 225 receives done sector status from the one or more disk logic modules 240-1 to 240-n indicating that the outstanding sectors have been flushed before sending control signals 237-1 to 237-n to the corresponding slave FIFOs 230-1 to 230-n to stop.

Referring to FIG. 4, each disk logic module 240-1 to 240-n may include an error response type encode module 245-1 to 245-n. In one embodiment, each error response type encode module 245-1 to 245-n is configured to received a report of an error detected by the respective disk logic module 240-1 to 240-n, and to read the error response type programmed for the detected error from the error response register 270. The error response type encode module 245-1 to 245-n then encodes the sector status for the sector that the respective disk logic module 240-1 to 240-n was processing at the time of the detected error with the error response type. For example, if the detected error is an uncorrectable sector error and the error response type for the uncorrectable sector error is a stop error response, then the error response type encode module 245-1 to 245-n may encode the sector status for the sector that the respective disk logic module 240-1 to 240-n was processing at the time of the uncorrectable sector error with the stop error response. When the master FIFO 225 receives the encoded status sector, the master FIFO 225 is able to determine which sector the respective disk logic module 240-1 to 240-n was processing at the time of the detected error. The master FIFO 225 may then report this sector to the microprocessor 215.

Referring back to FIG. 5, the disk controller 165 may also comprise an interrupt mask 285 and interrupt mask logic 290. In this embodiment, the interrupt mask 285 may be used to specify for which errors an interrupt will be sent to the microprocessor 210 to read the error status register 260. When an error is reported to the error status register 260, the interrupt mask logic 290 may compare the reported error with the interrupt mask 285 to determine whether to send an interrupt to the microprocessor 210 for the reported error. If the interrupt mask 285 specifies to send an interrupt for the reported error, then the interrupt mask logic 290 sends an interrupt to the microprocessor 210.

Figure 6:
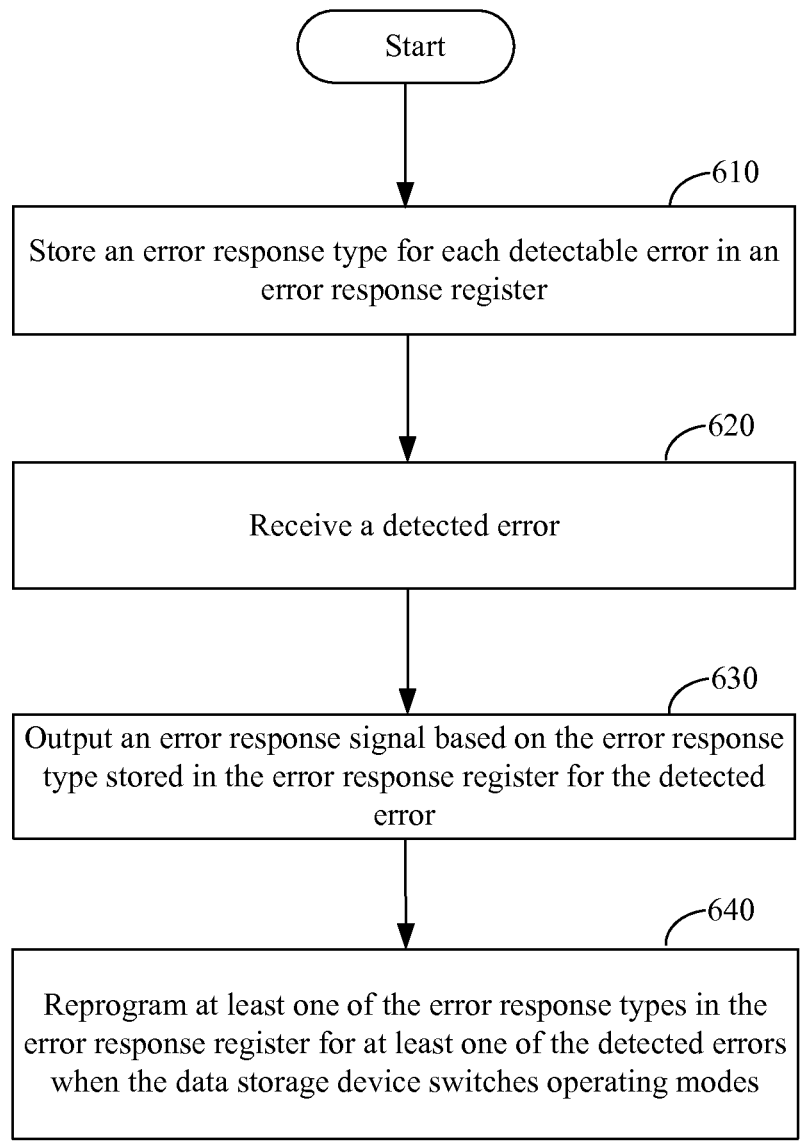
FIG. 6 is a flow diagram of a method for handling an error in a data storage device according to an embodiment of the present invention.

FIG. 6 is a flow diagram of a method for handing an error in a data storage device according to an embodiment of the present invention. In this embodiment, an error detected in the data storage device may be handled according to one of a plurality of different error response types, which may include the continue error response, the stop error response, the stop immediate error response, and the stop flush error response.

In step 610, an error response type for each detectable error is stored in an error response register 270. In step 620, a detected error is received. In step 630, an error response signal 222 is outputted based on the error response type stored in the error response register for the detected error. The error response signal 222 may be outputted to the command execution module 210 to respond to the error accordingly. In step 640, at least one of the error response types for at least one of the detectable errors in the error response register 260 is reprogrammed when the data storage device switches operating modes. This provides the flexibility to handle errors differently in different operating modes of the data storage device, as discussed above.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A data storage device having a plurality of different operating modes, comprising:
   a processor;
   a command execution module configured to receive commands from the processor, to execute the received commands, and to report status information to the processor; and
   an error response module comprising a programmable register configured to store one of a plurality of different error response types for each of a plurality of errors, wherein the error response module is configured to receive a report of one of the errors, and to output an error response signal to the command execution module based on the error response type stored in the register corresponding to the reported error;
   wherein the processor is configured to reprogram at least one of the error response types stored in the register for at least one of the errors when the data storage device switches from one of the operating modes to another one of the operating modes.

2. The data storage device of claim 1, wherein the operating modes comprise two or more modes selected from the group consisting of a read mode, a write mode, an intelligent burn in mode, a self servo write mode, a refresh mode, and a speculative read mode.

3. The data storage device of claim 1, wherein one of the error response types comprises a stop error response, wherein the error response signal based on the stop error response instructs the command execution module to stop data transfer on a sector boundary.

4. The data storage device of claim 1, wherein one of the error response types comprises a stop flush error response, wherein the error response signal based on the stop flush error response instructs the command execution module to flush data in a channel and to stop data transfer after the data in the channel is flushed.

5. The data storage device of claim 1, wherein one of the error response types comprises a stop immediate error response, wherein the error response signal based on the stop immediate error response instructs the command execution module to immediately stop data transfer.

6. The data storage device of claim 1, wherein one of the error response types comprises a continue error response, wherein the error response module does not output the error response signal based on the continue error type.

7. The data storage device of claim 1, further comprising an error status module is configured to output an n-bit vector indicating which one of the plurality of errors has occurred,
   wherein the error response module comprises:
      an error response encoder configured to output an n-bit vector for each of the error response types based on the error response types stored in the register for the plurality of errors; and
      an error response decoder configured to compare the n-bit vector from the error status module with the n-bit vector for each of the error response types and to output the error response signal based on the comparison.

8. The data storage device of claim 1, wherein the command execution module comprises:
   a master FIFO configured to receive the commands from the processor;
   a plurality of logic modules, wherein each logic module is configured to perform a sub-function of the command execution module; and
   a plurality of slave FIFOs, each slave FIFO corresponding to one of the logic modules, wherein each slave FIFO is configured to forward portions of the received commands in the master FIFO to the corresponding logic module.

9. The data storage device of claim 8, wherein each slave FIFO forwards portions of the received commands to the corresponding logic module that are relevant to the sub-function performed by the logic module.

10. The data storage device of claim 8, wherein the master FIFO is configured to control the plurality of logic modules based on the error response signal from the error response module.

11. The data storage device of claim 10, wherein, when the error response signal indicates a stop immediate error response, the master FIFO is configured to instruct at least one of the logic modules to immediately stop data transfer.

12. The data storage device of claim 10, wherein, when the error response signal indicates a stop error response, the master FIFO is configured to instruct at least one of the logic modules to stop data transfer on a sector boundary.

13. The data storage device of claim 10, wherein, when the error response signal indicates a stop flush error response, the master FIFO is configured to instruct at least one of the logic modules to flush data in a channel and to stop data transfer after the data in the channel is flushed.

14. The data storage device of claim 8, wherein at least one of the logic modules comprises an error response type encode module, the error response type encode module is configured to receive a report of one of the errors, to encode an error response type status for a data sector based on the error response type stored in the register corresponding to the error reported to the logic module, and to send the error response type status to the master FIFO via the corresponding slave FIFO.

15. The data storage device of claim 8, wherein at least one of the logic modules is configured to detect one of the errors, to generate a status indicating a data sector that the logic module was processing at the time of the detected error, and to send the status to the master FIFO.

16. The data storage device of claim 1, wherein the data storage device comprises a disk drive.

17. The data storage device of claim 1, wherein the data storage device comprises a solid state drive.

18. A method for handling an error in a data storage device having a plurality of different operating modes, the data storage device comprising a command execution module configured to receive and execute commands from a processor, the method comprising:
   storing, in a programmable register, one of a plurality of different error response types for each of a plurality of different errors;
   receiving a report of one of the errors;
   outputting an error response signal to the command execution module based on the error response type stored in the register corresponding to the reported error; and
   reprogramming at least one of the error response types stored in the register for at least one of the errors when the data storage device switches from one of the operating modes to another one of the operating modes.

19. The method of claim 18, wherein the operating modes comprise two or more modes selected from the group consisting of a read mode, a write mode, an intelligent burn in mode, a self servo write mode, a refresh mode and a speculative read mode.

20. The method of claim 18, wherein one of the error response types comprises a stop error response, wherein the error response signal based on the stop error response instructs the command execution module to stop data transfer on a sector boundary.

21. The method of claim 18, wherein one of the error response types comprises a stop flush error response, wherein the error response signal based on the stop flush error response instructs the command execution module to flush data in a channel and to stop data transfer after the data in the channel is flushed.

22. The method of claim 18, wherein one of the error response types comprises a stop immediate error response, wherein the error response signal based on the stop immediate error response instructs the command execution module to immediately stop data transfer.

23. The method of claim 18, wherein one of the error response types comprises a continue error response, wherein the error response signal is not outputted to the command execution module based on the continue error type.

24. The method of claim 18, wherein the data storage device comprises a disk drive.

25. The method of claim 18, wherein the data storage device comprises a solid state drive.

26. The method of claim 18, wherein the reprogramming at least one of the error response types stored in the register for at least one of the errors when the data storage device switches from one of the operating modes to another one of the operating modes comprises:

selecting a different error response type of the plurality of different error response types to respond to a same error based on a current operating mode of the plurality of different operating modes.

27. The data storage device of claim 1, wherein the processor is further configured to select a different error response type of the plurality of different error response types to respond to a same error based on a current operating mode of the plurality of different operating modes.

* * * * *